Dec. 13, 1932.　　　　C. M. ANDRES　　　　1,890,893

INDICATOR AND METHOD OF MANUFACTURING PARTS THEREOF

Filed March 12, 1931

Charles Michael Andres INVENTOR

BY　Walter E. S. Bradley ATTORNEY

Patented Dec. 13, 1932

1,890,893

UNITED STATES PATENT OFFICE

CHARLES MICHAEL ANDRES, OF YONKERS, NEW YORK, ASSIGNOR TO OTIS ELEVATOR COMPANY, OF NEW YORK, N. Y., A CORPORATION OF NEW JERSEY

INDICATOR AND METHOD OF MANUFACTURING PARTS THEREOF

Application filed March 12, 1931. Serial No. 522,181.

This invention relates to luminous indicators and a method of making parts of the same and particularly to luminous indicators which are especially adapted for use in elevator installations.

Luminous indicators are employed in elevator systems for various purposes. They are used not only to convey information to passengers and intending passengers but to car attendants and dispatchers as well. A considerable percentage of these indicators are for presenting information only at certain times and for presenting different information in accordance with operating conditions. Among these are those for indicating the approach and direction of travel of each elevator car, including the indicators in the corridors at each landing, and position indicators and direction of travel indicators in each car and at the dispatcher's station; those for indicating the calls registered, both in the cars and at the dispatchers station; "car coming" and "in use" indicators; those for indicating the floors served by the various cars; those for indicating the cars employed for night service; and the like. Such indicators usually consist of glass mounted in a frame or on a fixture of some other material such as metal or metal alloy. A light source or sources, depending upon the type of indicator, are employed for illuminating purposes, the arrangement usually being to cause light of a distinctive color to appear or to cause characters or symbols to appear either in white or in some distinctive color. Particular attention in present day elevator design is being paid to architectural effects and this is true of the various accessories to the elevator system, including the indicators.

One of the features of the invention is to provide a luminous indicator in which the light transmitting medium harmonizes with the fixture in which it is mounted.

Another feature resides in the provision of a light transmitting medium for a luminous indicator which permits the passage of light from a source on the opposite side of said medium from an observer but which presents the appearance to an observer of a continuous surface of any selected material when said source is not lighted.

A third feature is to provide a light transmitting medium for a luminous indicator which presents the appearance of metal or a metal alloy.

A fourth feature lies in the provision of a light transmitting medium for a luminous indicator of the type which displays characters or symbols when illuminated from a source on the opposite side of said medium from an observer and which renders the characters or symbols absolutely invisible to an observer when the source is not lighted.

A fifth feature of the invention resides in a method of manufacture of a light transmitting medium for a luminous indicator.

Other features and advantages will be apparent from the following description and appended claims.

The invention will be described by way of illustration in connection with an elevator hall lantern adapted to signal the approach and direction of travel of an elevator car.

Figures 1, 2:
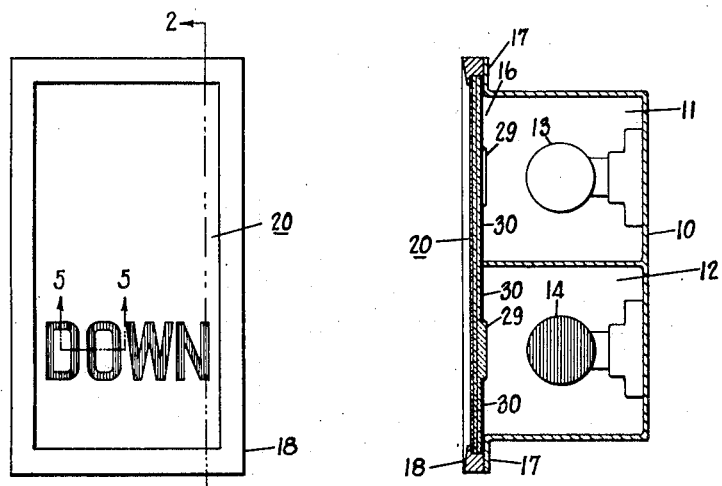
Figure 1 is a front elevation of an elevator hall lantern embodying the present invention.
Figure 2 is a sectional view taken along the line 2—2 of Figure 1.
Figure 3:
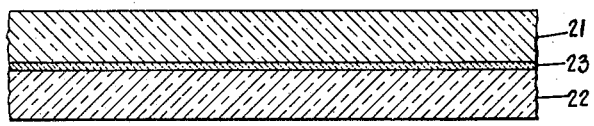
Figure 3 is an enlarged section of a fragment of glass used in constructing a part of the lantern shown in Figure 1.

A hall lantern embodying the present invention is illustrated in Figures 1 and 2 as comprising a box-like casing 10 having upper and lower compartments 11 and 12. A source of light is arranged in each compartment and in the present instance comprises electric light bulbs 13 and 14 secured to the casing 10. The bulb 14 in the lower compartment 12 is preferably red and the bulb 13 white or green. As illustrated the bulb 14 is lighted and the bulb 13 is not. The casing 10 is open at the front face 16 and has an outwardly directed shoulder 17 around the margin of face 16. The shoulder 17 and a frame 18 are used to secure a face plate 20 to the casing 10.

Figure 4:
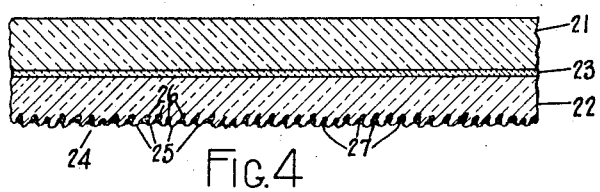
Figure 4 is a similar view of the part shown in Figure 3, certain steps in the construction of the above part having been performed.
Figure 5:
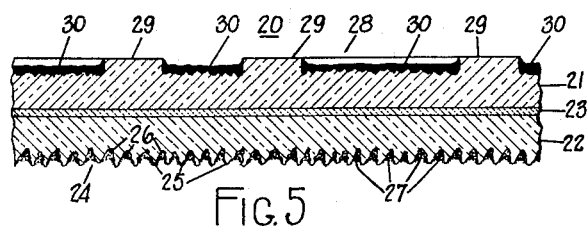
Figure 5 is a similar view of the part shown in Figures 3 and 4 in its final form, the section being taken along the line 5—5 of Figure 1.

This plate is made of transparent or translucent material, preferably of a sheet of shatterproof glass. This type of glass comprises two sheets of glass adhered to an intervening sheet of celluloid, and as shown, two sheets of glass 21 and 22 are adhered to an intervening sheet of celluloid designated 23. In preparing the face plate 20 one surface of the glass, for example the outer surface of sheet 22, is roughened by sand-blasting or by any other suitable method. Preferably a coarse steel grit is used to produce a roughened or open grained surface 24 having high spots or peaks 25 and depressions or recesses 26, which in an enlarged section appear substantially as illustrated in Figures 4 and 5.

To the roughened or open grained surface 24 thus produced, a thin metal coating 27 is applied by spraying or otherwise depositing finely divided molten particles of a metal or alloy which gives a surface of the desired appearance. The coating applied may be of any one of a number of steels, especially the stainless type of chrome or chrome-nickel steels, Swedish iron, any one of a number of bronzes, aluminum, zinc, tin, German silver, Monel, gold or silver and many other metals or alloys. Thus a wide variety of effects may be obtained so that a coating may be produced to match or harmonize with the fixture and other objects which are to be disposed in the vicinity of the lantern.

The molten particles first come to rest at the bases of the recesses 26 during the spraying process and anchor themselves to the glass and to each other. The high spots or peaks 25 are left uncovered. The coating builds up from the bases of the recesses toward the tops of the peaks 25 so that a coating of fifteen thousandths of an inch or less, for example, will but partially fill the recesses 26 and leave the majority of the peaks 25 exposed. The thickness of the coating may be varied in accordance with the roughness of the surface to which it is applied. The metal coating thus lacks continuity and permits the passage of light through the uncovered peaks of the glass.

The opposite side of the face plate 20, designated 28, has a stencil formed on its surface. Preferably this stencil is formed by adhering a sheet of protective material to the surface 28 and cutting through the protective material the outline of the desired representations or characters. The protective material used is resilient and a sand-blast has little or no effect on it except to roughen slightly its surface because the particles of the steel grit or other abrasive used, bounce from the resilient material rather than cut deeply into the same. After cutting the outline of the desired characters in the protective material all of this material except that portion forming the characters is pulled off from the surface 28. The surface 28 is then subjected to a sand-blasting operation in which a fine abrasive, preferably a fine steel grit, is used. This roughens the exposed portions of surface 28 and cuts a sharp outline of the desired characters in the glass leaving the smooth surface film of the glass beneath the protective material intact. The abrasive employed in the sand-blast is then changed to a coarse steel grit and the exposed portions subjected to the cutting operation of the coarse abrasive which produces a roughened or open-grained surface. A lacquer or other opaque material 30 is then sprayed over surface 28 until the roughened surface is completely covered. The protective material forming the characters is then pulled off from the smooth glass portions of surface 28 leaving raised characters 29, the tops of which present the original smooth surface of the glass.

In the construction illustrated, the plate 20 has raised characters 29 forming the words "Down" and "Up." The word "Down" is disposed in front of the bulb 14 and is visible from the front of the lantern because the bulb 14 is lighted. The word "Up" is disposed in front of the bulb 13 but is invisible from the front of the lantern because the bulb 13 is inactive.

With an active source of light behind the lower half of the plate 20 the light passes through the clean top surface of raised characters 29 and through the plate 20, a sufficient amount of light passing through the peaks 25 of surface 24 to make the illuminated characters forming the word "Down" distinctly perceptible. The metallic coating deposited at the bases of the recesses of the roughened surface will cut down the direct transmission of light through surface 24 and practically eliminate any transmission of reflected light through the plate. The metallic particles forming coating 27 will cause the illuminated portion of surface 24 to appear mottled if examined at short distances. However, if a strong light is applied back of the raised characters the metallic particles will be practically invisible if viewed at longer distances. In the absence of an active source of light in back of both the upper or the lower halves of plate 20, this plate appears to be of solid metal and gives no indication as to the existence of the characters 29 on the back of the plate.

It is to be noted that the plate 20 may be of any transparent or translucent material rather than the shatterproof glass as illustrated. The shatterproof glass, however, offers the advantages of: having increased strength, not separating if broken, rendering a fracture line inobvious unless that fracture line passes through a character, preventing light leakage from one character to another, and having uniform color and thickness. When plain glass has its face and back surfaces cut away by sand-blasting it becomes rather brittle. On the other hand in case the two outside surfaces of a sheet of shatterproof glass are cut away the two inside surfaces of the glass sheets adhered to the celluloid binder are still intact and provide increased strength in addition to that afforded by the celluloid binder. Plain glass also is apt to have bubbles of sufficient size and near enough to the surface to affect sand-blasting. Plain glass shows more light leakage from one character to another than does the shatterproof glass and if two sheets of plain glass are used the light leakage may be considerable. Shatterproof glass shows no light leakage from one character to another, either through the celluloid or the glass, and the light is cut off at a very sharply defined line.

Although it is preferable to make the face plate and stencil a single unit, as above described, the plate may be backed by a stencil of opaque material having the desired characters removed from the sheet instead of cutting the stencil into the back of plate 20 as previously described. The face surface 24 is treated the same in each case. Colored glass may be employed, if desired, instead of different colored lamps, or the different color effects may be produced in other ways.

Although the invention has been described with reference to a hall lantern, it is also applicable to indicators utilized for other purposes. In case of position indicators and annunciators, not only may the light transmitting medium be arranged to display characters, such as floor numbers, by stencils formed on the glass or separate therefrom but also where the appearance of light transmitting apertures is desired, one or more for each floor, these registrations may be formed by raised portions on the back of the glass as above described. Also, numbers or other characters may be formed in raised portions. For indicators which operate simply to display light as distinguished from characters or symbols of light, the surface of the glass viewed by an observer may be arranged as described for the front of plate 20 with the opposite surface untreated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A light transmitting medium for a luminous indicator comprising, a light transmitting body having one surface roughened to form peaks and recesses therein, and a coating fixed in said recesses but not covering said peaks.

2. A light transmitting medium for a luminous indicator comprising, a light transmitting body having one surface roughened to form peaks and recesses therein, and a metal coating deposited in said recesses to partially fill the same without covering said peaks.

3. A face plate for a luminous sign comprising, two sheets of glass adhered to an intervening sheet of celluloid and having the outside surface of one glass sheet roughened to form peaks and recesses therein, and a sprayed metal coating deposited in said recesses to partially fill the same without covering said peaks.

4. An indicator glass comprising, a light transmitting body having one surface roughened to form peaks and recesses therein, and metallic particles adhered to said roughened surface and to each other to build up a coating from the bases of said recesses towards the tops of said peaks so as partially to fill the recesses without covering the peaks.

5. An indicator glass comprising, two sheets of glass adhered to an intervening sheet of celluloid, the outside surface of one glass sheet being roughened to form peaks and recesses therein, metallic particles adhered to said roughened surface and to each other to build up a coating from the bases of said recesses toward the tops of the peaks so as to partially fill the recesses without covering the peaks, the outside surface of the second sheet of glass, exclusive of a portion of desired shape, being roughened to form peaks and recesses therein, and an opaque material adhered to the roughened portion of said last named surface so as to fill the recesses and cover the peaks therein.

6. A luminous indicator comprising, a casing having an open face, a source of light in said casing, and a light transmitting medium for covering said open face, said medium comprising a light transmitting body having one surface roughened to form peaks and recesses therein, and a coating of a selected material, other than that of said body, deposited in said recesses to partially fill the same without covering said peaks.

7. A luminous indicator comprising, a casing having upper and lower compartments, said casing having an open face, an opaque partition between said compartments, a source of light in each compartment, a plate for covering said open face comprising a light transmitting body having one surface roughened to form peaks and recesses therein, and a sprayed metal coating deposited in said recesses to partially fill the same without covering said peaks.

8. A luminous indicator comprising, a casing having upper and lower compartments, said casing having an open face, an opaque partition between said compartments, a source of light in each compartment, a glass plate for covering said open face, the outer surface of said plate being roughened to form peaks and recesses therein, metallic particles adhered to said roughened surface and to each other to build up a coating from the bases of said recesses toward the tops of the peaks so as to partially fill the recesses without covering the peaks, and a stencil between said plate and said light source.

In testimony whereof, I have signed my name to this specification.

CHARLES MICHAEL ANDRES.